United States Patent
Borsarelli et al.

(10) Patent No.: US 6,520,319 B2
(45) Date of Patent: Feb. 18, 2003

(54) ASSEMBLY FOR ADJUSTING THE HEIGHT OF A GRIPPING MECHANISM ON A MACHINE FOR MOLDING GLASS ARTICLES

(75) Inventors: Gianclaudio Borsarelli, Cuneo (IT); Giovanni Carenini, Villanova di Mondovi' (IT); Fabrizio Ferrero, Cuneo (IT); Bruno Viada, Madonna delle Grazie (IT); Carlo Sesia, Cuneo (IT)

(73) Assignee: Bottero S.p.A., Cuneo (IT)

( * ) Notice: Subject to any disclaimer, the term of this patent is extended or adjusted under 35 U.S.C. 154(b) by 0 days.

(21) Appl. No.: 09/922,744

(22) Filed: Aug. 7, 2001

(65) Prior Publication Data

US 2002/0066643 A1 Jun. 6, 2002

(30) Foreign Application Priority Data

Aug. 8, 2000 (IT) ..................... TO200A792

(51) Int. Cl.$^7$ ............................. B65G 25/00
(52) U.S. Cl. ............. 198/750.11; 65/260; 414/226.01
(58) Field of Search ............. 198/468.2, 750.11; 414/225.01, 226.01, 226.02, 751.1, 753.1; 65/260

(56) References Cited

U.S. PATENT DOCUMENTS

| | | | | |
|---|---|---|---|---|
| 2,500,083 A | | 3/1950 | MacConnell | |
| 3,401,029 A | * | 9/1968 | Roberts | 65/260 |
| 4,255,179 A | * | 3/1981 | Foster | 65/260 |
| 4,325,725 A | * | 4/1982 | Fujimoto | 65/260 |
| 4,351,663 A | * | 9/1982 | Wood | 65/260 |
| 5,125,789 A | * | 6/1992 | Farr | 414/753.1 |
| 5,587,000 A | * | 12/1996 | Mann et al. | 65/260 |

FOREIGN PATENT DOCUMENTS

| | | |
|---|---|---|
| EP | 0 620 196 | 10/1994 |
| EP | 0 658 519 | 6/1995 |

* cited by examiner

*Primary Examiner*—Joseph E. Valenza
(74) *Attorney, Agent, or Firm*—Oblon, Spivak, McClelland, Maier & Neustadt, P.C.

(57) ABSTRACT

An assembly for adjusting the height of a gripping mechanism on a machine for molding glass articles has an upright supporting a gripping head for gripping the glass articles, and an actuating assembly for activating the gripping head and, in use, moving the gripping head, with respect to the upright, between a gripping position gripping the glass articles, and a release position releasing the glass articles onto a supporting surface; the upright has a bottom connecting portion, which is connected to a structure of the machine so as to slide in a vertical direction, and the height of which is adjustable by means of a motor located beneath the supporting surface and in parallel with a transmission activated by a crank.

24 Claims, 3 Drawing Sheets

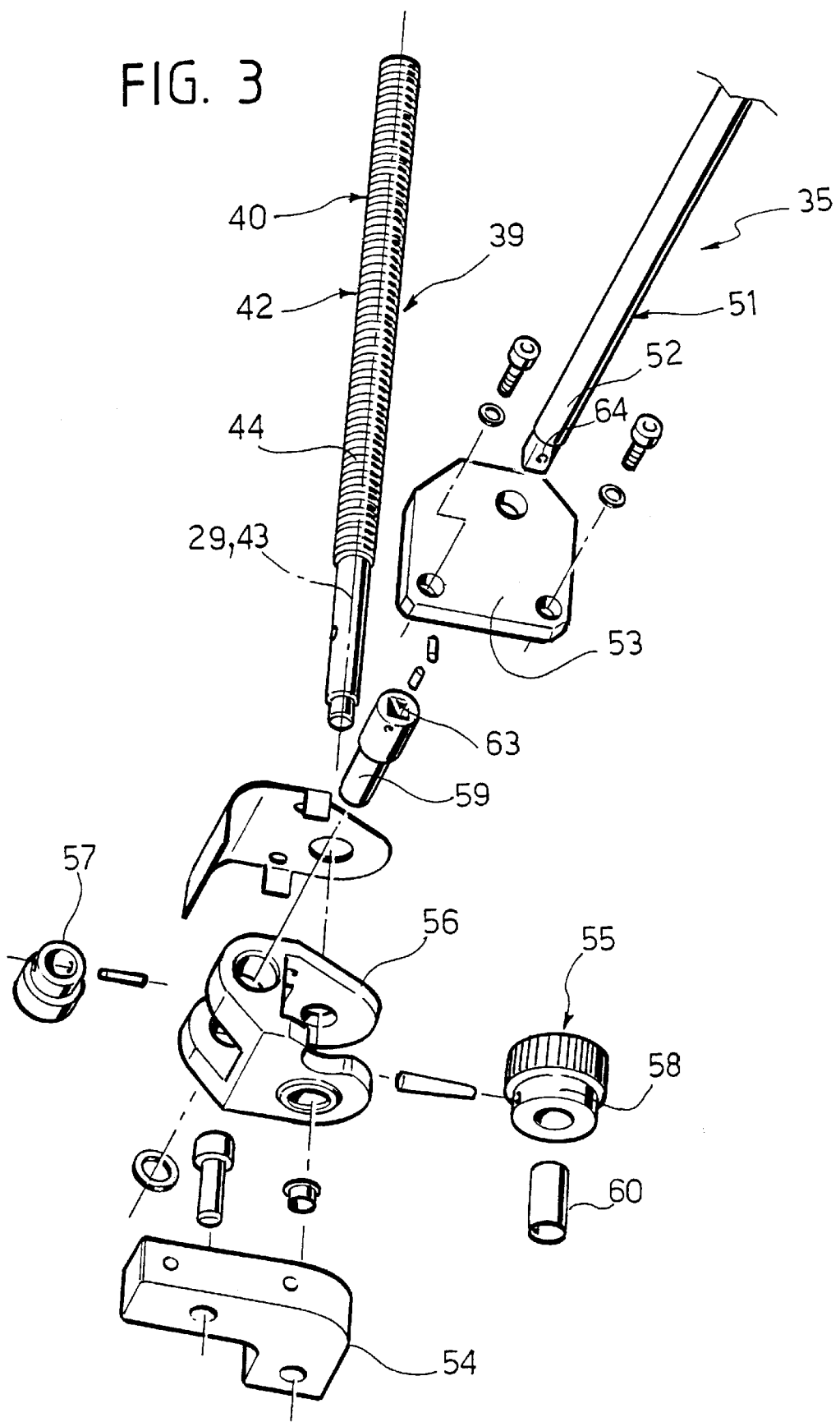

ASSEMBLY FOR ADJUSTING THE HEIGHT OF A GRIPPING MECHANISM ON A MACHINE FOR MOLDING GLASS ARTICLES

The present invention relates to an assembly for adjusting the height of a gripping mechanism on a machine for molding glass articles, in particular, a so-called I.S. machine.

BACKGROUND OF THE INVENTION

As is known, I.S. machines comprise a number of molding sections, each comprising a rough mold, a finish mold, and a transfer assembly for gripping the glass articles formed in the finish mold and transferring them onto a supporting surface of the machine.

Known transfer assemblies comprise an upright supporting a gripping device, wherein at least one normally pincer-type gripping head is located over the supporting surface to grip one or more glass articles, and is movable between a gripping position and a release position, in which the transferred glass articles are released, by means of a pneumatic actuator housed in a cavity beneath the supporting surface.

The height of the gripping head with respect to the supporting surface must be adjusted alongside changes in the size and shape of the glass articles, which, on I.S. machines, are normally produced in different lots. And this is done by the operator manually raising or lowering the head, normally using locators or fixtures selected according to the article being produced.

Known transfer assemblies of the above type have various drawbacks, all due to the way in which the height of the gripping head is adjusted. That is, adjustment must be made manually by an operator, who must first of all have detailed knowledge of the type of article to be produced, and who, for each gripping head on the machine, must make a rough adjustment using, for example, the relative locators, followed by a fine adjustment and a careful check of the new position. Adjusting the height of the gripping heads thus involves a good deal of time and cost, the cost factor being further compounded by a number of operators normally being assigned to making the adjustment, and all with no guarantee that, in the end, all the gripping heads are at the same height.

SUMMARY OF THE INVENTION

It is an object of the present invention to provide an assembly for adjusting the height of a gripping mechanism, designed to provide a straightforward, reliable solution to the above problem, and which, at the same time, is compact and easy to assemble and disassemble to and from the machine.

According to the present invention, there is provided an assembly for adjusting the height of a gripping mechanism on a machine for molding glass articles; the assembly comprising a stand, in turn comprising a connecting portion for connection to a structure of said machine, and a supporting portion for a gripping head for gripping the glass articles; actuating means for moving, in use, said gripping head between a gripping position and a release position in which the glass articles are released onto a supporting surface for supporting the glass articles; and adjusting means for adjusting the height of said gripping head with respect to said supporting surface in a substantially vertical direction; characterized in that said actuating means are connected to said supporting portion over said supporting surface; and said adjusting means comprise a motor located beneath the supporting surface and acting on said stand.

BRIEF DESCRIPTION OF THE DRAWINGS

A non-limiting embodiment of the invention will be described by way of example with reference to the accompanying drawings, in which:

FIG. 3 shows a larger-scale exploded view in perspective of a detail of the FIG. 1 assembly.

DETAILED DESCRIPTION OF THE INVENTION

Figure 1:
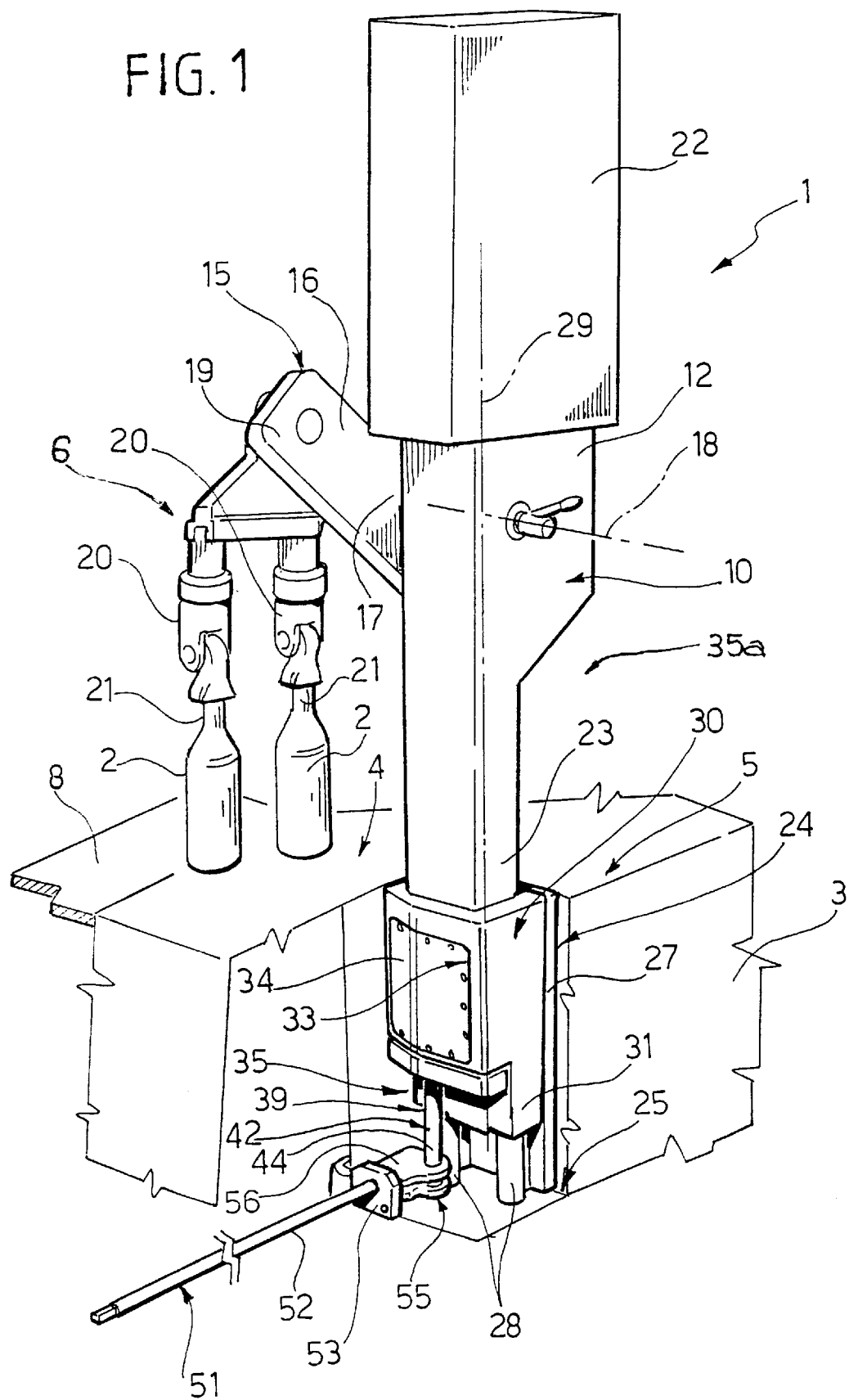
FIG. 1 shows a preferred embodiment of the assembly according to the present invention for adjusting the height of a gripping mechanism on a machine for molding glass articles.

Number 1 in FIG. 1 indicates as a whole a machine for molding glass articles, in particular a so-called I.S. machine for molding hollow glass articles 2 such as bottles and containers. Machine 1 comprises a base 3 defining a horizontal top supporting surface 4, and a number of molding sections, one of which is shown partly and indicated 5 in FIG. 1, and comprises a rough mold (not shown), a finish mold (not shown), and a transfer or so-called "take-out" assembly 6 for gripping, in use, the articles 2 formed in the finish mold, and transferring them onto surface 4, from which articles 2 are then pushed in known manner onto a conveyor belt 8 extending along the molding sections.

With reference to FIG. 1, assembly 6 is fitted to base 3 and comprises a stand or upright 10 extending vertically from base 3 and comprising a top end portion 12 supporting a known gripping device 15. Device 15 comprises an arm 16 having one end 17 fitted to portion 12 to rotate about a horizontal hinge axis 18, and an opposite end 19 supporting two members 20, in particular pincer-type members, for gripping the top portions 21 of respective articles 2.

Portion 12 also supports an actuating assembly 22 fitted in known manner (not shown) to arm 16 to move members 20, with respect to upright 10, between a gripping position in which articles 2 are removed from the finish mold, and a release position in which articles 2 are released onto surface 4.

Figure 2:
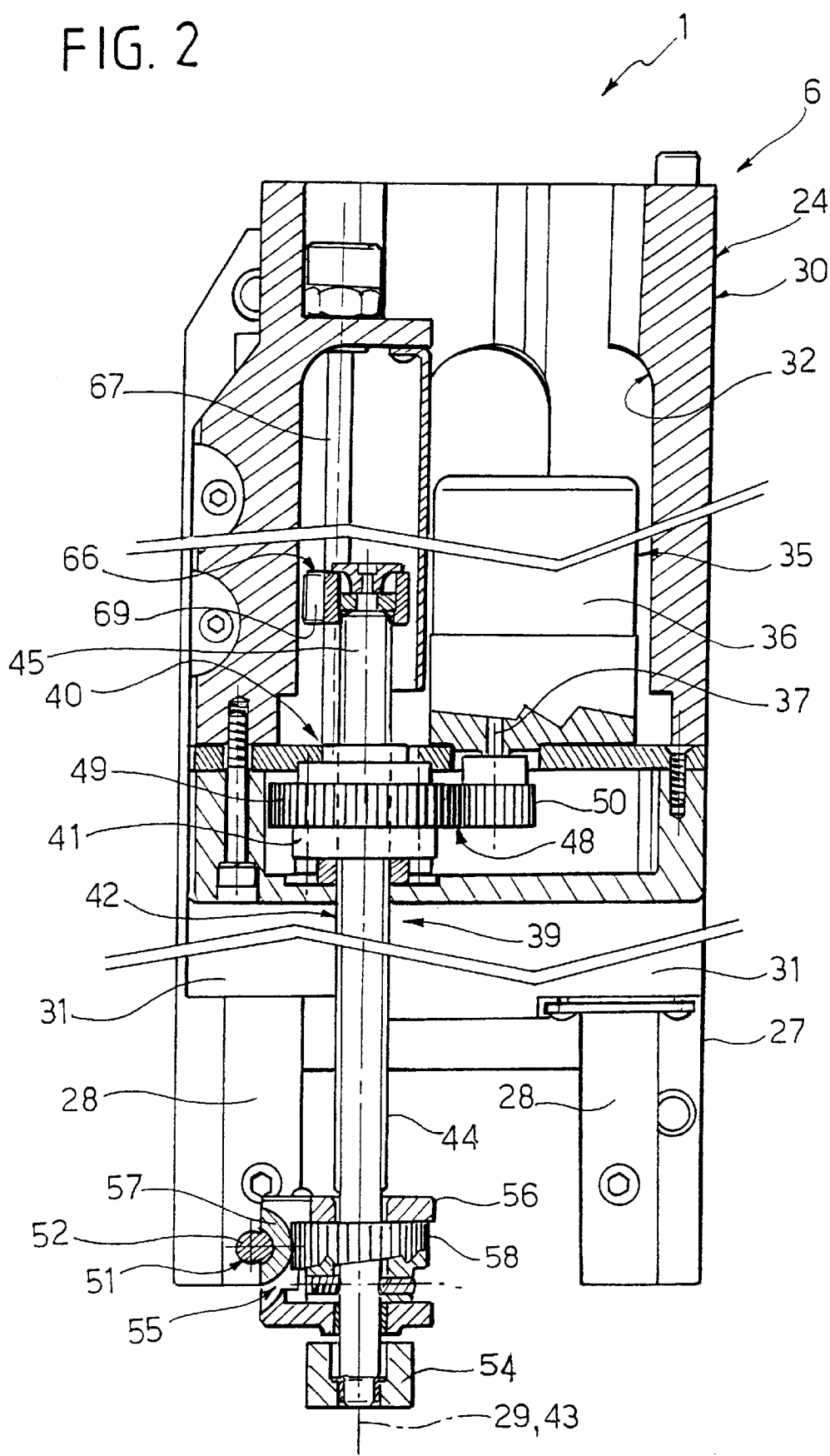
FIG. 2 shows a larger-scale section, with parts removed for clarity, of the FIG. 1 assembly.

As shown in FIGS. 1 and 2, upright 10 also comprises a bottom portion 23 connected to base 3 by a connecting assembly 24 housed inside a cavity 25 (shown partly in FIG. 1) formed in base 3 beneath surface 4. Assembly 24 comprises a mounting plate 27 fitted integrally to base 3 and itself fitted integrally with two elongated guide members 28 housed inside cavity 25 and parallel to a substantially vertical direction 29. Assembly 24 also comprises a housing 30, which is integral with portion 23 and comprises two slide portions 31 facing respective members 28 and defining respective cylindrical seats (not shown) connected in sliding manner to members 28 to enable housing 30 and upright 10 to travel with respect to base 3 in direction 29.

Housing 30 defines an inner compartment 32, which comprises an access opening 33 formed on the opposite side to plate 27 and closed by a removable cover 34, and houses an actuating device 35 defining, together with upright 10, an assembly 35a for adjusting the height of gripping device 15 with respect to surface 4 and in a direction parallel to direction 29.

Device 35 is located inside cavity 25 beneath surface 4, and comprises a self-braking electric motor 36 housed inside compartment 32, connected integrally to housing 30, and comprising an output shaft 37, which is substantially parallel to direction 29 and controls the travel of upright 10 by means of a transmission 39.

Transmission 39 comprises a threaded, irreversible, screw-nut screw coupling 40 defined by a nut screw 41 and by a threaded cylindrical rod 42, which has an axis 43 parallel to direction 29 and comprises two opposite end portions 44 and 45; portion 44 extending beneath housing 30, and portion 45 extending inside compartment 32 and being connected to nut screw 41.

Nut screw 41 is connected in rotary and axially-fixed manner to housing 30 so as to move axially along rod 42 when nut screw 41 itself or rod 42 is rotated, and is activated by shaft 37 via the interposition of a reducer 48 forming part of device 35 and comprising two meshing gears 49 and 50; gear 49 being coaxial and integral with nut screw 41, and gear 50 being fitted integrally to shaft 37 and having a smaller outside diameter than gear 49.

With reference to the accompanying drawings, besides using motor 36, the height of upright 10 and device 15 can also be adjusted manually by means of a crank 51 (shown partly), which comprises an end rod 52 extending horizontally through a plate 53 fitted integrally to base 3 by means of a bracket 54 (FIG. 3). Rod 52 activates an irreversible toothed transmission 55, which is interposed between crank 51 and rod 42, is supported by a substantially fork-shaped body 56, and comprises a worm 57 and a helical gear 58.

Worm 57 and gear 58 mesh with each other and are connected to body 56 via the interposition of respective bushes 59, 60 (FIG. 3) to rotate, with respect to body 56 and in axially-fixed positions, about respective perpendicular skew axes. Gear 58 is connected integrally and coaxially to portion 44, while worm 57 is connected integrally to bush 59, an axial seat 63 of which is engaged in angularly-fixed, axially-withdrawable manner by a prismatic end 64 of rod 52 (FIG. 3).

Beneath body 56, the free end of portion 44 is connected in rotary manner to fixed bracket 54, which defines an axial shoulder preventing rod 42 from moving towards the bottom surface of cavity 25. As shown in FIG. 2, the position assumed by housing 30 in direction 29 and, therefore, the height of upright 10 with respect to base 3 are detectable by means of a linear position transducer 66 housed inside compartment 32. Transducer 66 comprises a sensor member 67, which is connected integrally to housing 30, is positioned facing portion 45, and is elongated in direction 29; and a slide 69, which is connected in axially-fixed manner to the free end of portion 45, and slides along sensor member 67.

To fit assembly 6 to machine 1, plates 27 and 53 are fitted integrally to base 3, and housing 30 is inserted downwards inside cavity 25 so that slide portions 31 engage guide members 28.

The axial position of rod 42 is then adjusted with respect to housing 30 by operating motor 36 to position body 56 facing plate 53; and, finally, rod 52 is inserted through base 3 and plate 53 in a direction perpendicular to axis 43 so that prismatic end 64 engages seat 63 in bush 59.

Assembly 6 is disassembled from machine 1 by simply withdrawing rod 52 from seat 63 and plate 53, so that upright 10, together with the whole of device 35, can be raised to remove housing 30 from cavity 25.

In actual use, when motor 36 is operated from a control panel (not shown) of machine 1, rod 42 remains angularly fixed, by virtue of irreversible transmission 55 and of rod 51 being lockable reversibly in known manner in an angularly fixed position, whereas nut screw 41, rotating about axis 43, travels along rod 42 to adjust the height of housing 30, upright 10 and members 20 with respect to surface 4.

In the event of a fault on motor 36, crank 51 can be released and operated manually to rotate worm 57 about its axis and rotate rod 42 about axis 43. At the same time, nut screw 41 remains angularly fixed, by being connected to motor 36 and by virtue of irreversible coupling 40, and therefore travels along rod 42 to move upright 10 vertically.

Detecting the position of slide 69 along sensor member 67 indicates the exact position of upright 10 with respect to the base in direction 29, and so enables precise control of motor 36.

Device 35 therefore provides for adjusting the height of upright 10 and device 15 easily and accurately to adapt the configuration of assembly 6 to the shape and size of articles 2 for transfer, and with substantially no change in the size of assembly 6 as compared with known solutions. Device 35, in fact, is housed inside cavity 25, which is already provided on commonly used I.S. machines and is normally occupied by a pneumatic actuator for moving the gripping members. In the case of assembly 6, in which assembly 22 over surface 4 is substituted for the known pneumatic actuator, cavity 25 is substantially free and can be used to house at least motor 36.

Installing motor 36 with shaft 37 positioned vertically also makes device 35 compact enough to be housed inside cavity 25.

The possibility of operating crank 51 in parallel with and independently of motor 36 enables operation of transmission 39 even in the event of motor 36 breaking down. At the same time, rod 52 of crank 51 keeps rod 42 inside, and resting against the bottom surface of, cavity 25, with no need for complex retaining members, and, by withdrawably engaging seat 63, enables assembly 6 to be assembled and disassembled quickly and easily to and from machine 1.

Assembly and disassembly of assembly 6 are further simplified by device 35 and, in particular, motor 36 being carried directly by housing 30 and so sliding inside cavity 25 together with upright 10.

The irreversibility of transmission 39, and in particular of coupling 40, eliminates the need for complex locking members to lock upright 10 to the height set using device 35.

Clearly, changes may be made to assembly 6 as described and illustrated herein without, however, departing from the scope of the present invention.

In particular, provision may be made for a transmission 39 other than the one described and illustrated by way of example, e.g. two separate transmissions for motor 36 and crank 51; and the location of assembly 22 may be other than as shown, providing it is over surface 4 to leave cavity 25 available to house motor 36.

Assembly 6 may be provided with a different gripping device from device 15, so that assembly 6 can be used for transferring glass products other than articles 2 shown, or for moving other members and/or devices of sections 5, such as the bottom molds, the height of which must be adjusted according to the type of glass articles 2 to be produced.

What is claimed is:

1. An assembly (35a) for adjusting the height of a gripping mechanism on a machine (1) for molding glass articles (2); the assembly (35a) comprising a stand (10), in turn comprising a connecting portion (23, 30) for connection to a structure (3) of said machine (1), and a supporting portion (12) for a gripping head (20) for gripping the glass articles (2); actuating means (22) for moving, in use, said gripping head (20) between a gripping position and a release position in which the glass articles (2) are released onto a supporting surface (4) for supporting the glass articles (2); and adjusting means (35) for adjusting the height of said gripping head (20) with respect to said supporting surface (4) in a substantially vertical direction (29); characterized in that said actuating means (22) are connected to said supporting portion (12) over said supporting surface (4); and said adjusting means (35) comprise a motor (36) located beneath the supporting surface (4) and acting on said stand (10).

2. An assembly as claimed in claim 1, characterized in that said motor (36) has an axis substantially parallel to said substantially vertical direction (29).

3. An assembly as claimed in claim 1, characterized in that said motor (36) is carried directly by said connecting portion (23, 30).

4. An assembly as claimed in claim 1, characterized in that said adjusting means (35) comprise first transmission means (40, 48) activated by said motor (36).

5. An assembly as claimed in claim 4, characterized in that said first transmission means (40, 48) comprise at least one irreversible mechanical transmission (40).

6. An assembly as claimed in claim 5, characterized in that said irreversible mechanical transmission (40) comprises a threaded first rod (42) having an axis (43) parallel to said substantially vertical direction (29); and a nut screw (41) connected to said first rod (42).

7. An assembly as claimed in claim 6, characterized in that said nut screw (41) is carried in rotary and axially-fixed manner by said connecting portion (23, 30); said first rod (42) comprising an end portion (44) fitted in axially-fixed manner to said structure (3).

8. An assembly as claimed in claim 7, characterized in that said nut screw (41) is activated by said motor (36).

9. An assembly as claimed in claim 8, characterized in that said first transmission means (40, 48) comprise a reducer (48) interposed between said nut screw (41) and said motor (36).

10. An assembly as claimed in claim 1, characterized in that said adjusting means (35) comprise manual actuating means (51) operated independently of said motor (36); and second transmission means (55, 40) activated by said manual actuating means.

11. An assembly as claimed in claim 10, characterized in that said second transmission means (55, 40) comprise a threaded second rod (42) having an axis (43) parallel to said substantially vertical direction (29).

12. An assembly as claimed in claim 11, characterized in that said second rod (42) comprises a first portion (45) connected in rotary and axially-sliding manner to said connecting portion (23, 30); and a second portion (44) connected in axially-fixed manner to said structure (3).

13. An assembly as claimed in claim 12, characterized in that said first and second transmission means comprise a common threaded rod (42).

14. An assembly as claimed in claim 13, characterized in that said second transmission means (55, 40) comprise a helical gear (58) integral with said rod (42); and a worm (57) meshing with said helical gear (58).

15. An assembly as claimed in claim 14, characterized in that said worm (57) and said helical gear (58) are supported by the same body (56).

16. An assembly as claimed in claim 11, characterized by comprising retaining means (52, 53) for retaining said rod (42) axially with respect to said structure (3).

17. An assembly as claimed in claim 10, characterized in that said manual actuating means (51) comprise a crank (51) connected releasably to said second transmission means (40, 55).

18. An assembly as claimed in claim 16, characterized in that said retaining means (52, 53) comprise a shoulder (53) connected integrally to said structure (3); and a stop portion (52) forming part of said crank (51).

19. An assembly as claimed in claim 18, characterized in that said stop portion (52) is withdrawable in a direction perpendicular to said rod (42).

20. An assembly as claimed in claim 1, characterized by comprising guide and slide means (28, 31) interposed between said structure (3) and said connecting portion (23, 30).

21. An assembly as claimed in claim 1, characterized in that said connecting portion (23, 30) comprises a housing (30) housing said motor (36).

22. An assembly as claimed in claim 1, characterized by comprising detecting means (66) for detecting, in use, the position of said stand (10) with respect to said structure (3).

23. An assembly as claimed in claim 21, characterized in that said detecting means (66) are housed in said housing (30).

24. An assembly as claimed in claim 22, characterized in that said detecting means (66) are associated with transmission means (39) activated by said motor (36).

* * * * *

UNITED STATES PATENT AND TRADEMARK OFFICE
CERTIFICATE OF CORRECTION

PATENT NO. : 6,520,319 B2
DATED : February 18, 2003
INVENTOR(S) : Borsarelli et al.

It is certified that error appears in the above-identified patent and that said Letters Patent is hereby corrected as shown below:

<u>Title page,</u>
Item [30], Foreign Priority Data should read:

-- [30]     Foreign Application Priority Data

Aug. 8, 2000    (IT) ........................... TO00A792 --

Signed and Sealed this

Twenty-sixth Day of August, 2003

JAMES E. ROGAN
*Director of the United States Patent and Trademark Office*